Sept. 9, 1941. T. O. WENTWORTH 2,255,235
PROCESS FOR EXTRACTING ACETIC ACID FROM AQUEOUS MIXTURES
Filed July 20, 1938
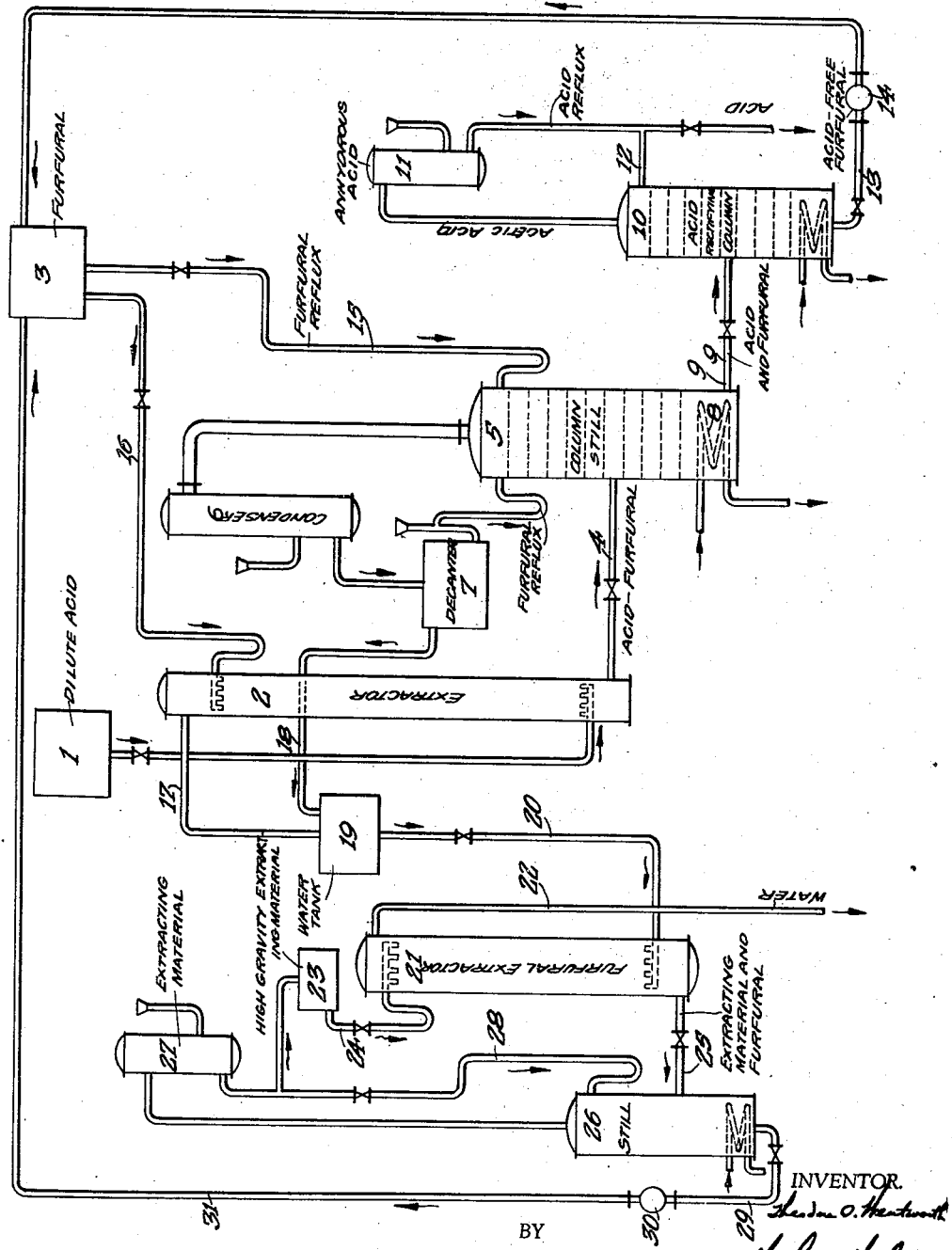
INVENTOR.
Theodore O. Wentworth
BY
W. Lee Helms
ATTORNEY.

Patented Sept. 9, 1941

2,255,235

UNITED STATES PATENT OFFICE 2,255,235

PROCESS FOR EXTRACTING ACETIC ACID FROM AQUEOUS MIXTURES

Theodore O. Wentworth, Cincinnati, Ohio

Application July 20, 1938, Serial No. 220,174

3 Claims. (Cl. 260—541)

This invention relates to a process for the separation of acetic acid from aqueous solutions, and the present application is a continuation in part of my application filed December 16, 1936, Serial No. 116,110 (Patent 2,123,348 of July 12, 1938). The process claimed in the said application relates to the dehydration of aqueous acetic acid by azeotropic distillation thereof in a column still, the aqueous acetic acid being introduced to a mid-point of the column, and the furfural-water-vapors distilled over the top of the column being condensed and the condensate decanted, the furfural being returned to the head of the column as reflux and an additional amount of furfural being passed to the head of the column as reflux above that required for the azeotropic mixture and sufficient to hold down the acid to produce substantially acid-free water at the top of the column.

The present invention relates to a preliminary extraction of the aqueous acetic acid, also using furfural. Furfural has a very favorable distribution coefficient, i. e., the percentage of acetic acid in a furfural layer is approximately the same as the percentage of acetic acid in a water layer in contact therewith. This is very good, considering that most acetic acid extractants hitherto used which have the high boiling range of furfural usually have much less favorable distribution coefficients.

Since furfural is heavier than water or aqueous acetic acid, it will usually be passed countercurrently downwardly against the rising stream of aqueous acid in any extraction process in contradistinction to the usual practice of passing solvents, having a lower specific gravity than water, upwardly against a descending stream of aqueous acid. I have found that it is desirable to carry out this liquid-liquid extraction prior to the azeotropic distillation at as low a temperature as practical, in order to reduce to a minimum the quantity of water which dissolves in the furfural layer leaving the extraction process and which contains the extracted acid.

When using furfural for the extraction of relatively concentrated aqueous acid solutions, as for example, those containing from 10% to 40% acid, it may be found desirable to reduce the quantity of water which will dissolve in the furfural layer leaving the extraction process by other means in addition to the use of low extraction temperatures. I have found that an effective supplementary method for further reducing the dissolved water content of the furfural layer involves the addition of an organic material, or materials to the solvent furfural. Such a material, or materials, should be highly water-immiscible, that is, should dissolve a negligible quantity of water, and should be completely miscible with both acetic acid and furfural. The boiling point of the added solvent should be reasonably close to that of furfural and in any case, higher than that of acetic acid and sufficiently divergent therefrom to permit its ready separation by ordinary distillation methods. The quantity of such added solvent may vary from 5% to 50% of the solvent furfural mixture, depending on the desired water content of the furfural layer leaving the extraction process. I have found, for example, that octyl acetate is a suitable solvent for addition to furfural for the purpose of reducing water solubility, and that there are other organic materials and mixtures which have physical properties similar to octyl acetate and which, when combined with furfural as a solvent, exhibit to a greater or lesser degree the effects described above.

For example, in the handling of aqueous acid solutions of various concentrations, I have found that by the use of an efficient extractor and using approximately twice as much furfural as aqueous acetic acid, it is possible to remove all but about 0.1% acetic acid from the watery layer leaving the extractor. The furfural layer thus discharged may contain from 1% to 15% acetic acid, depending on the initial acid concentration of the aqueous solution subjected to extraction, and from 5 to 7% water. The exact quantity of water which the furfural layer will contain is fixed by the acid concentration, the exit temperature at which the furfural layer leaves the extractor, and the quantity of water-insoluble solvent, such as octyl acetate, which has been added to the solvent furfural for the purpose of reducing water solubility. By means of this extraction step, the greater part of the water in the original aqueous solution is eliminated. The furfural layer is then fed to the middle point of the azeotropic distilling column, the operation of which has been previously described, and the water separated from the acetic acid and furfural therein by the azeotropic distillation. The acetic acid-furfural mixture from the base of the azeotropic column is then fractionated to separate the concentrated acetic acid and furfural, which may contain an added solvent, which material is divided with part going to the extracting operation and part to the head of the distilling column.

The process will be described with reference to the accompanying drawing. In the description which follows, reference is made to furfural only as the solvent for the sake of clarity. It is understood, however, that the solvent furfural may contain an added solvent such as octyl acetate, in those instances where process conditions make the use of such added solvent desirable. In the drawing, the figure is a schematic view of a complete assembly of units for effecting the extraction of the acetic acid and for recovery of the furfural from the aqueous layers discharged from the acid extractor and the decanter.

Referring to the drawing, dilute acid from the tank 1 is fed to the base of the acid extractor 2. Furfural for extracting acetic acid from the water is supplied from the tank 3 and flows through the valved pipe line 16 into the top of the extractor in counter-current relationship to the dilute acetic acid. In this contacting it extracts substantially all of the acid and discharges from the base of the extracting column in valved pipe line 4 to distilling column 5. Distilling column 5 operates as an azeotropic rectifying column and discharges from the top a mixture of vapors of furfural and water to condenser 6, wherein they are condensed and the condensate flows to decanter 7.

In decanter 7 two layers are formed, i. e., an aqueous layer and a furfural layer. The furfural layer being heavier, discharges from the bottom and is passed to the top of the azeotropic column 5 to serve as reflux in preventing acid vapors from rising in this column.

Column 5 is suitably heated by a steam coil 8 and by the time the liquid mixture reaches the base of this column and the steam coil 8 substantially all of the water has been separated therefrom and the anhydrous mixture of acetic acid and furfural discharges by the valved line 9 to an acid rectifying column 10 wherein the acetic acid is rectified as vapors substantially free from furfural at the top in the normal method of rectification. The vapors are condensed in the condenser 11, a part returned as reflux through the line 12 and the balance discharged as the substantially anhydrous acid.

The furfural in its turn is substantially separated by the rectification action in column 10 and is discharged at the base substantially free of acid through the valved pipe line 13 and, after suitable cooling, is pumped by means of the pump 14 to the storage tank 3 for furfural. Furfural is also drawn from the storage tank 3 by means of a valved line 15 to the top of the azeotropic column 5. This furfural serves as reflux liquid in addition to that supplied from the decanter. Another stream of furfural drawn from the tank 3 by the valved pipe line 16 feeds the extractor 2 as already mentioned.

The water discharged from the acid-extracting column 2 by means of pipe line 17 is, of course, saturated with furfural, as is also the water discharged from the decanter 7 by means of the pipe line 18 and both streams are discharged to the water storage tank 19. Water in the tank 19 must be suitably treated to remove the furfural for re-use. The usual method for effecting this recovery of furfural would be by means of steam distillation.

In the present case the water saturated with furfural is passed by means of the valved line 20 to the furfural extractor 21. In this extractor the furfural-saturated water is counter-currently contacted with a stream of suitable organic liquid such as paraffin hydrocarbons, aromatic hydrocarbons, or their halogenated derivatives. In the present case, a material such as ethylene dichloride is utilized which has a higher specific gravity than water saturated with furfural and thus will descend in the extraction column. In this extracting operation the water flows upwardly in 21 and is entirely freed of furfural, then discharging by means of the pipe line 22 from this extractor. This water will, of course, be saturated with the furfural extracting agent such as ethylene dichloride in this case. In the usual case, it will be possible to so select this extracting material from the relatively inexpensive solvents available that it will not be worth while to recover the small amount of solvent discharged in this water layer. In those few cases where it might be worth while, this may be done in the usual distillation manner as has been standard practice in all work relating to extraction and azeotropic distillation of acetic acid.

The ethylene dichloride used for this extraction is stored in the supply tank 23 and passes to the extractor by the valved line 24. It then descends in the extracting column 21 and by counter-current washing picks up all of the furfural previously dissolved in the water; it discharges at the base through the valved line 25 and passes to the distilling column 26 wherein the ethylene dichloride, being comparatively volatile, is removed at the top as vapors, condensed in the condenser 27, partly returned as reflux to the column 26 by means of the valved line 28 and partly discharged to the ethylene dichloride storage tank 23. Any small amount of water which may be dissolved in the ethylene dichloride-furfural mixture will, of course, be distilled with the ethylene dichloride but will make no difference in the operation of the system, since the water may be readily decanted off. From the base of the column 26 the furfural is discharged substantially pure by means of the valved line 29 and, after suitable cooling, is picked up by the pump 30 and discharged through the line 31 to the furfural storage tank 3. It will thus be seen that an important part of the invention resides in the step of recovering furfural from the aqueous layers discharged from the acid extractor and the decanter by means of a subsequent liquid extraction with ethylene dichloride or with one or a mixture of hydrocarbons selected from the group of paraffin hydrocarbons, aromatic hydrocarbons, their chlorinated derivatives. Also to be noted is the fact that in some cases the liquid or liquid mixture used for removing the furfural and the furfural itself may be heavier or lighter than water, depending on the selection of the material and the ratio of this material to furfural which may be used. It is, of course, necessary to use the liquid-liquid extractor in such a way that two liquid layers are formed separating in opposing currents.

Having described my invention, what I claim is:

1. The step in the dehydration of aqueous acetic acid which comprises subjecting the same to a counter-current of furfural, containing an added organic solvent other than furfural but having a boiling point in the range of furfural and which will dissolve a negligible quantity of water and which is completely miscible with acetic acid and furfural, in an extractor.

2. The step in the dehydration of aqueous acetic acid which comprises subjecting the same to a counter-current flow of furfural, the furfural containing octyl acetate as the added solvent, in an extractor.

3. The step in the dehydration of aqueous acetic acid, which comprises subjecting a volume of aqueous acetic acid to a counter-current flow of substantially twice the volume of furfural, in an extractor.

THEODORE O. WENTWORTH.